United States Patent
Daniel, III

(10) Patent No.: US 6,814,522 B1
(45) Date of Patent: Nov. 9, 2004

(54) PIVOT ASSEMBLY

(75) Inventor: James P. Daniel, III, Florence, SC (US)

(73) Assignee: Aluminum Ladder Company, Florence, SC (US)

( * ) Notice: Subject to any disclaimer, the term of this patent is extended or adjusted under 35 U.S.C. 154(b) by 0 days.

(21) Appl. No.: 10/612,217

(22) Filed: Jul. 2, 2003

(51) Int. Cl.[7] .................................................. F16D 3/00
(52) U.S. Cl. ........................ 403/162; 403/161; 403/163; 403/119; 384/206; 16/273; 52/183; 182/1
(58) Field of Search ................................ 403/65, 71, 79, 403/161–163, 119; 384/206, 208; 16/273, 274, 378, 386, 387; 52/183; 182/1

(56) References Cited

U.S. PATENT DOCUMENTS

| 4,619,544 | A | * | 10/1986 | Laidely | 403/162 |
| 5,024,283 | A | * | 6/1991 | Deli | 403/79 |
| RE34,659 | E | * | 7/1994 | Reilly | 403/162 |
| 5,372,373 | A | * | 12/1994 | Reel | 384/208 |

* cited by examiner

Primary Examiner—Daniel P. Stodola
Assistant Examiner—Michael P. Ferguson
(74) Attorney, Agent, or Firm—Charles L. Schwab; Nexsen Pruet, LLC

(57) ABSTRACT

A pivot assembly particularly adapted for pivotally interconnecting a pair of relatively thin parallel walls spaced an appreciable distance from one another. A stud with a pivot joint on one end is interposed between the walls.

6 Claims, 3 Drawing Sheets

PIVOT ASSEMBLY

TECHNICAL FIELD

This invention relates to a sleeve bearing pivot assembly between a pair of spaced walls which holds the walls in spaced relation to one another while permitting relative pivotal movement.

BACKGROUND OF THE INVENTION

Sleeve bearings are the preferred bearing for many applications because of their reasonable cost, ease of installation, long life and load carrying capability. Light weight structures which have thin parallel load bearing walls and which need to be pivotally connected to one another on an axis transverse to the walls, present a design problem in that deflection of the walls under the load carried by the pivot joint will unevenly load a typical sleeve bearing.

SUMMARY OF THE INVENTION

The present invention provides a pivot assembly interconnecting a pair of spaced parallel thin walls which uses a sleeve bearing whose bearing surfaces are evenly loaded even though the walls deflect under the load carried by the bearing. A component of the sleeve bearing is mounted in such a manner that it changes it orientation relative to a wall when either of the walls deflect under load.

DESCRIPTION OF THE DRAWINGS

One embodiment of the invention is shown in the drawings, in which.

DETAILED DESCRIPTION OF THE INVENTION

Figure 1A:
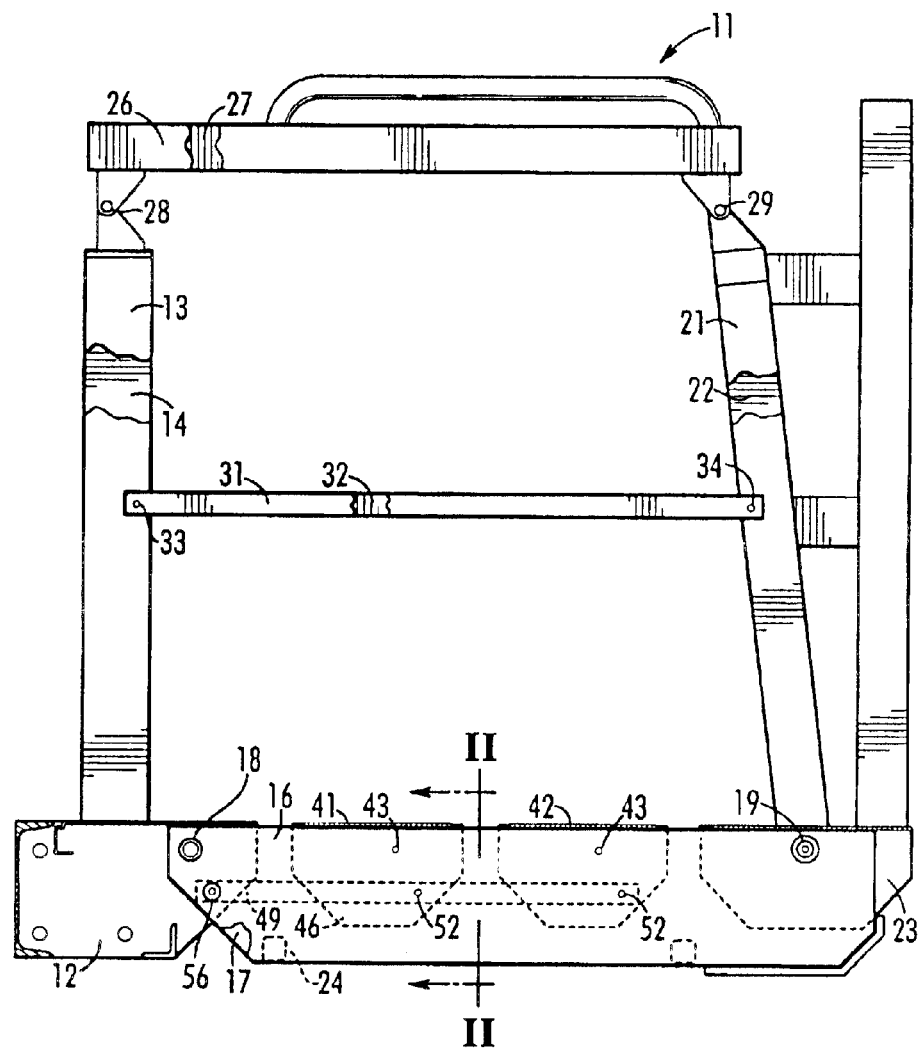
FIG. 1A is a side view of a stairway which may be raised and lowered.

Referring to FIGS. 1A-3, the illustrated stairway 11 includes a stationary base 12 with a pair of laterally spaced parallel support posts 13, 14 rigidly secured to the base 12. A pair of parallel walls or stair joists 16, 17 have corresponding ends pivotally connected to the base 12 on a transverse horizontal axis by coaxial pivot pins 18, only one of which is shown. The opposite corresponding ends of the stair joists 16, 17 are pivotally connected to a pair slanting uprights 21, 22 by a pair of coaxial pivot pins 19, only one of which is illustrated, for pivotal movement about a transverse horizontal axis. A step module 23 has it laterally opposite ends rigidly secured, respectively, to the lower ends of the uprights 21, 22. The stair Joists 16, 17 are fabricated from relatively thin flat sheets of metal and are reinforced by a cross bracing structure 24.

Figure 1B:
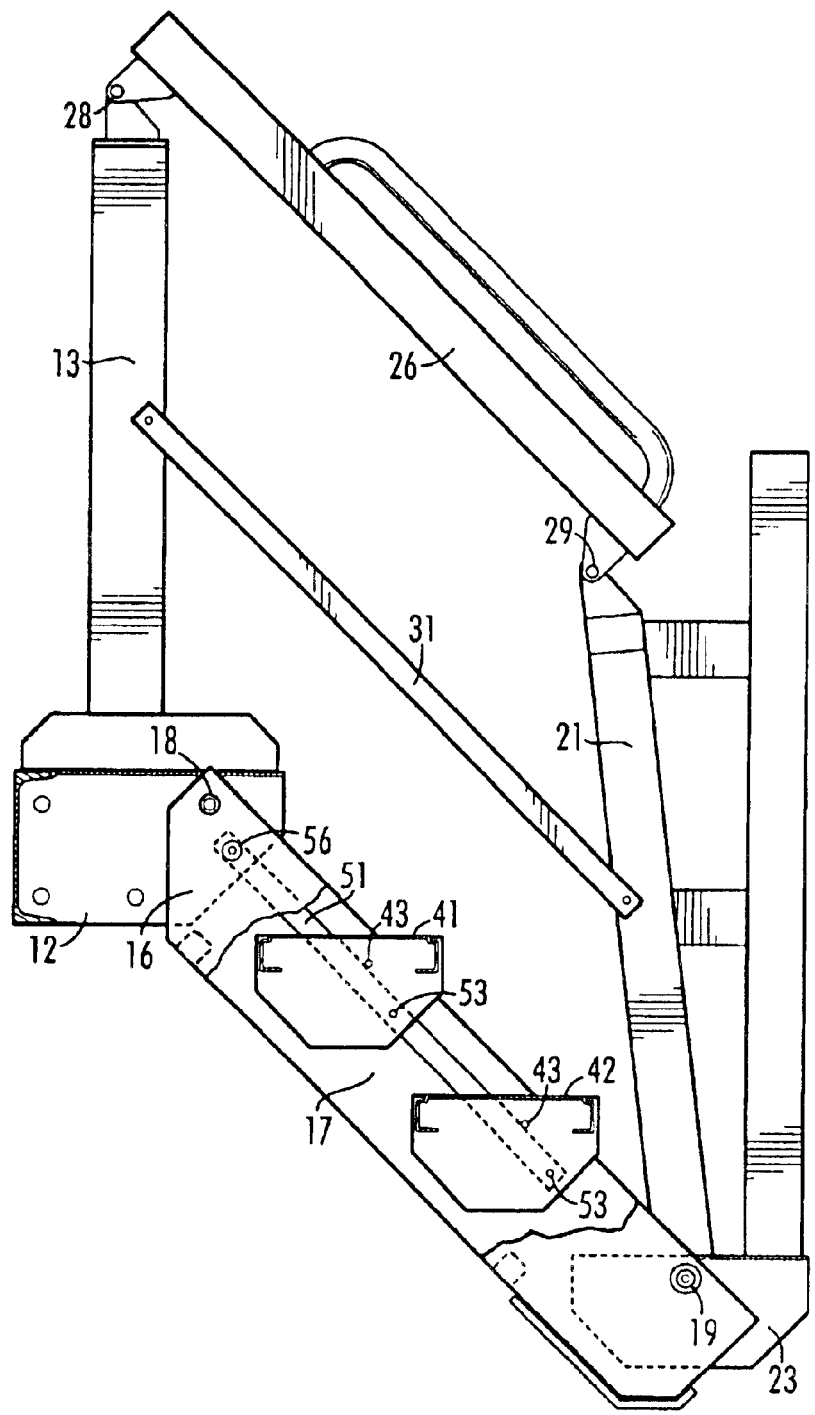
FIG. 1B is a side view showing the stairway in a lowered position.

A pair of upper links 26, 27 are pivotally connected at their opposite ends to upper ends of the posts 13, 14 and to the upper ends of the uprights 21, 22 by suitable pins 28, 29. A pair of intermediate links 31, 32, serving as hand rails, are pivotally connected at their opposite ends to the posts 13, 14 and to the uprights 21, 22 by transverse pivot pins 33, 34. The support posts 13, 14 and the base 12 provide a stationary support for the stair joists 16, 17. The axes of the pins 18, 28 and 33, lie in a first plane. The axes of the pins 19, 29 and 34 lie in a second plane parallel to the first plane. The spacing of the pins is such as to create a parallel linkage which allows the step 23 and the uprights 21, 22 to be raised and lowered. The lowered position is shown in FIG. 1B.

Figure 2:
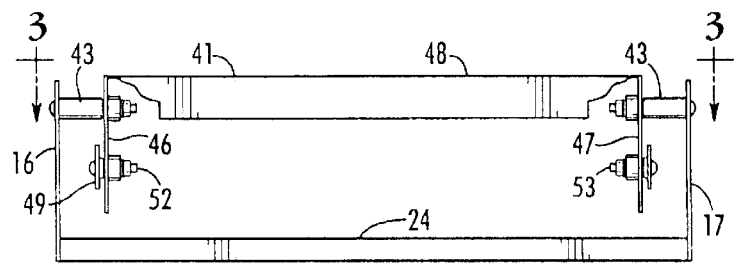
FIG. 2 is a section taken along the line II—II in FIG. 1.
Figure 3:
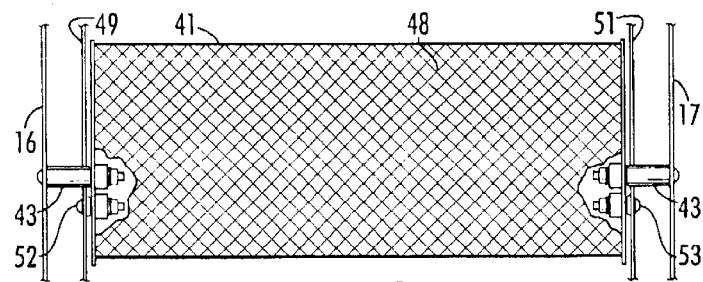
FIG. 3 is top view of the step shown in FIG. 2.

A pair of step modules 41, 42 are pivotally connected to the stair joists 16, 17 by pivot assemblies 43. As shown in FIGS. 2 and 3, the step module 41 has thin flat vertical side walls or plates 46, 47 to which a tread 48 is welded. Step module 42 is of the same general construction. A pair of link rods 49, 51 are pivotally connected by pins 52, 53 to the side plates 46, 47 of the steps modules 41, 42 and have corresponding ends pivotally connected to the base 12 by pins 56 so that when the step module 23 is raised or lowered, the treads of the step modules 41, 42 will remain horizontal as they raised or lowered.

Figure 4:
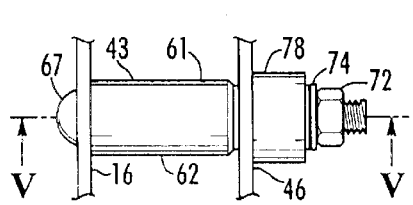
FIG. 4 is an enlarged view of a pivot assembly.
Figure 5:
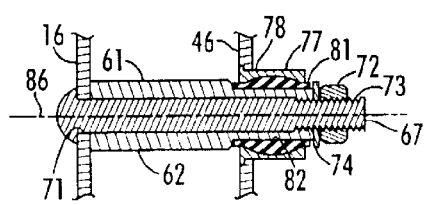
FIG. 5 is a section on the line V—V in FIG. 4.
Figure 6:
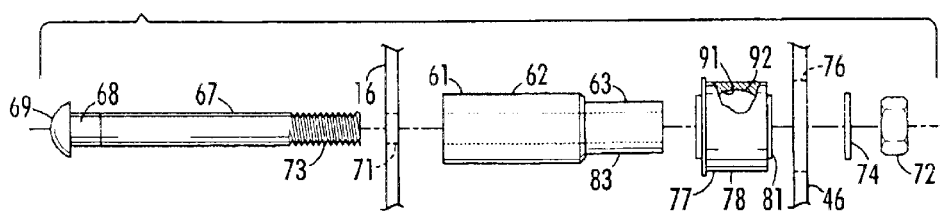
FIG. 6 is an exploded view of the pivot assembly.

Referring to FIGS. 4-6, the pivot assembly 43 includes a stepped diameter pivot rod or cylindrical stud 61 which has a large exterior diameter part 62 and a small exterior diameter part 63 separated by a shoulder presenting a flat annular axially facing abutment surface 64. The cylindrical stud 61 had a hollow interior defined by a bore 66 which has a coaxial relationship with the cylindrical exterior surfaces of the large and small diameter portions 62, 63. The stud 61 is secured to the joist 16 by a tension member in the form of a round headed bolt 67 having square section portion 68 adjacent its head 69 which nonrotatably mates with a square hole 71 in the joist 16 and a nut 72 on the threaded end 73 of the bolt applying axial thrust against the reduced diameter end of the stud 61 through a washer 74.

The side plate 46 of the step module 41 has an annular opening or bore 76 into which a radially outer sleeve 77 of a sleeve bearing module 78 is pressed. A radially inner sleeve 81 has a radially inward facing cylindrical bearing surface 82 in radial thrust bearing engagement with a radially outward facing cylindrical bearing surface 83 of the reduced diameter portion 63 of the stud 61.

The sleeves 77, 81 have complimentary spherical load bearing surfaces 91, 92 which are textured in such a way that relative movement about axes at right angles to the axis 86 of sleeve bearing surfaces 82, 83 is permitted but relative rotation of the sleeves 11, 81 about axis 86 is prevented. The inner sleeve 81 is made of a plastic or synthetic composition known for its suitability for use in self lubricated or nonlubricated bearings. The illustrated two piece sleeve bearing is currently marketed as a SPYRAFLO bearing. The mating spherical surfaces 91, 92 allows relative movement between the inner sleeve 81 and its support sleeve 77 to compensate for deflection of the walls 16, 47, thereby insuring even loading of the cylindrical bearing surfaces 82, 83.

What is claimed is:

1. A pivot assembly comprising:

a pair of thin flat parallel walls spaced from one another in a side by side relationship having axially aligned bores respectively, extending transverse to said walls, a hollow cylindrical stud having:

a large exterior diameter part extending from one of its ends with a flat surface on said one end in abutting relation to one of said walls, a reduced exterior diameter part at the other end of said stud presenting an axially outer end, and an axially facing shoulder at the junction of said parts, a bearing including:
- a radially inner sleeve having an axially inner end in axial thrust transmitting engagement with said shoulder, an interior diameter presenting a bearing surface in radial load bearing engagement with said reduced exterior diameter part of said stud and a radially outward facing spherical load bearing surface, and
- a radially outer sleeve having a radially inward facing spherical load bearing surface in load bearing engagement with said outward facing load bearing surface of said radially inner sleeve and a radially outward facing cylindrical surface in press fit engagement with said bore of the other of said walls,
- a bolt having a shank with a head on one of its ends engaging said one wall and threads on its other end, said shank extending through said opening in said one wall and axially through the interior of said hollow cylindrical stud, and
- a nut in threaded engagement with said threaded end of said bolt and in axial thrust transmitting relation with said axially outer end of said reduced exterior diameter part.

2. The pivot assembly of claim 1 and further comprising a washer between said nut transmitting relation with said axially outer end of said reduced exterior diameter part.

3. The pivot assembly of claim 2 wherein said washer is in axially confronting relation to said radially inner sleeve of said bearing.

4. The pivot assembly of claim 1 wherein said radially inner sleeve is plastic.

5. The pivot assembly of claim 1 wherein said sleeves are movable relative to one another about axes transverse to the axis of the interior diameter of said radially inner sleeve and wherein said sleeves are nonrotatable relative to one another about said axis of said interior diameter of said radially inner sleeve.

6. A pivot assembly comprising:
- a pair of thin flat parallel walls spaced from one another in a side by side relationship having axially aligned bores, respectively, extending transverse to said walls,
- a hollow cylindrical stud having:
  - a large exterior diameter part extending from one of its ends with a flat surface on said one end in abutting relation to one of said walls,
  - a reduced exterior diameter part at the other end of said stud presenting an axially outer end, and
  - an axially facing shoulder at the junction of said parts,
- a sleeve bearing including:
  - a radially inner sleeve having an axially inner end in axial thrust transmitting engagement with said shoulder, an interior diameter presenting a bearing surface in radial load bearing engagement with said reduced exterior diameter part of said stud and a radially outward facing spherical load bearing surface, and
  - a radially outer sleeve having a radially inward facing spherical load bearing surface in load bearing engagement with said outward facing load bearing surface of said radially inner sleeve and a radially outward facing cylindrical surface in press fit engagement with said bore of the other of said walls,
- a bolt having a shank with a head on one of its ends presenting an axial thirst transmitting surface and threads on its other end, said shank extending axially through the interior of said hollow cylindrical stud and through said opening in said one wall, and
- a nut in threaded engagement with said threaded end of said bolt and having an axial thrust transmitting surface,
- one of said axial thrust transmitting surfaces being in engagement with said one wall and the other of said axial thrust transmitting surfaces being in engagement with said axially outer end of said reduced exterior diameter part.

\* \* \* \* \*